United States Patent [19]

Chung

[11] Patent Number: 4,851,957

[45] Date of Patent: Jul. 25, 1989

[54] SAFETY DEVICE FOR TELECOMMUNICATION EQUIPMENT

[75] Inventor: Ki Ho Chung, Seoul, Rep. of Korea

[73] Assignee: Samhwa Electric Industrial Co., Ltd., Seoul, Rep. of Korea

[21] Appl. No.: 141,703

[22] Filed: Jan. 7, 1988

[30] Foreign Application Priority Data

| | | | |
|---|---|---|---|
| Jan. 7, 1987 | [KR] | Rep. of Korea | 56 |
| Feb. 23, 1987 | [KR] | Rep. of Korea | 2083 |
| Apr. 28, 1987 | [KR] | Rep. of Korea | 6256 |
| Sep. 1, 1987 | [KR] | Rep. of Korea | 14957 |

[51] Int. Cl.[4] .............. H02H 3/20

[52] U.S. Cl. .............. 361/124; 361/91; 361/93; 361/118; 361/120

[58] Field of Search .............. 361/86, 87, 91, 93, 361/103, 105, 117, 118, 119, 120, 124, 125

[56] References Cited

U.S. PATENT DOCUMENTS

| | | | |
|---|---|---|---|
| 4,062,054 | 12/1977 | Simokat | 361/120 |
| 4,288,833 | 9/1981 | Howell | 361/105 X |
| 4,314,304 | 2/1982 | Baumbach | 361/119 X |
| 4,639,820 | 1/1987 | Dolausky et al. | 361/119 X |
| 4,642,723 | 2/1987 | Achtrig et al. | 361/119 X |
| 4,692,833 | 9/1987 | Chung | 361/105 X |
| 4,723,190 | 2/1988 | Chung | 361/105 X |
| 4,729,055 | 3/1988 | Doriual et al. | 361/119 |

FOREIGN PATENT DOCUMENTS 11754 7/1974 Rep. of Korea .

*Primary Examiner*—Derek S. Jennings
*Attorney, Agent, or Firm*—Willian Brinks Olds Hofer Gilson & Lione

[57] ABSTRACT

A safety device for telecommunication equipment wherein a telecommunication circuit is promptly grounded when overvoltage is applied to the circuit or overcurrent is led to it and in which the production of excessive head and of damage to the communication equipment is prevented. The safety device includes an overvoltage protective circuit which comprises a ceramic discharge tube having a ground electrode on the middle part of the discharge tube, and end electrodes on opposite sides of the discharge tube; a shorting member positioned between the ground electrode and the end electrodes; and insulating means for preventing the shorting member from electrically coupling the ground electrode and the end electrodes, the insulating means including a low melting temperature material which is melted upon the release of heat by the ceramic discharge tube at a desired temperature as a result of an overvoltage for causing the shorting member to electrically couple and provide a short circuit between the ground electrode and the end electrodes. The overcurrent protective device includes heat coils and bimetal switch means for grounding the overcurrent when the coils are continuously heated for a period of time by the overcurrent.

19 Claims, 11 Drawing Sheets

SAFETY DEVICE FOR TELECOMMUNICATION EQUIPMENT

TECHNICAL FIELD

The present invention relates generally to a safety device for protecting telecommunication equipment. More specifically, the invention is directed to a safety device which is disposed between the inner and outer lines of a communication line between phone subscribers or telephone offices to prevent damage to the communication equipment and risk of injury or loss of life by effectively grounding overcurrent and overvoltage produced by contact of the line by a high-voltage cable or by a natural disaster.

The safety device comprises an overvoltage protective device, including a discharge tube, for directly grounding overvoltage when the temperature of the discharge tube rises above a desired temperature (for example, 250°-300° C.) by leading overvoltage; and an overcurrent protective device, including a heat coil, for protecting against overcurrent when the heat coil of the overcurrent protective device is continuously heated by leading overcurrent.

BACKGROUND OF THE INVENTION

As known in this technical field, overcurrent and overvoltage on a communication line of a momentary or continuous nature are caused by lightning or by contact of the line by a high-voltage cable as a result of damage from a natural disaster such as an earthquake, storm or flood; and it is necessary to prevent damage to communication equipment or possible loss of life which may result therefrom. Prior art safety connectors are known which include a discharge tube and an overcurrent protective element, and overcurrent and overvoltage on the inner line of the communication equipment is prevented by grounding any overcurrent or overvoltage caused by lightning or contact with a high-voltage line.

The prior art discharge tubes comprises ceramic discharge tubes and include two electrode tubes (diodes) and three electrode tubes (triodes). The two electrode tube is disposed leading line and grounding protection of a set of communication line, respectively, and heat is produced at high temperature when overvoltage is continuously held, but because the two electrode tube (diode), separated respectively, is covered with outer cylindrical tube and lower melting lead (Pb) connecting with the leading line is melted and interrupted by production of heat of the device, production of heat for the housing of the safety device is hardly in existence. However, when the overvoltage is led, only discharge tube of a led line is operated and the communication equipment is protected. Accordingly, on the near other line which overvoltage is not led, the overvoltage is induced and the line is affected adversely and effective protection for the communication equipment against overvoltage is not provided.

The triode has a set of communication lines and is a relatively simple structure. Although overvoltage is led on one line discharge, which is produced by ionization of gas trapped within the discharge tube, is advanced and grounding is made to other line. Accordingly, the problems of a diode are overcome, but in the structure of the triode, the problem of heat could not be overcome. Specifically when in discharge, high temperature heating results and the triode is not practically used because the safety connector and housing have anxiety for production of fire (High temperature: that is, when AC of 5A is conducted on the triode discharge tube, heat at about 100° C. is produced after 1 second (Sec), 250° C. after 2 Sec., 500° C. after 3 Sec., 600° C. after 4 Sec., 650° C. after 5 Sec., and up to about 1000° C. after 10 Sec.). The specification of the ceramic discharge tube, which has been used by the Korean Telecommunication Authority (100, Sejongro, Chongro-Gu, Seoul, The Republic of Korea), is described as follows: After AC of 5A is conducted for 1 second the AC is interrupted for 3 minutes. The AC is then again conducted for 1 second and interrupted for 3 minutes—such processes are repeated and tested 5 to 10 times. Under the above conditions, the discharge tube should be maintained self-functioning. As other conditions, the housing should not be modified or fire not produced by production of heat on the discharge tube when AC of 5A is applied for 15 minutes.

The present inventor has filed a prior patent application in order to meet the above-listed conditions and to overcome the above-described problems. In the prior application a ceramic discharge tube is provided in which discharge thereof is stopped and the production of fire is prevented by mounting bimetals between electrodes of the discharge tube and the ground. The bimetals expand when the temperature of the discharge tube increases, and make contact with the ground, resulting in about zero volts in the potential difference between electrodes. The prior patent application by the present inventor, however, has many problems to be solved. Specifically, when the overvoltage is led by thermal expansion properties of the bimetal, the discharge tube produces heat. The operating time in which contact by thermal expansion of the bimetal is accomplished becomes a variable parameter, dependent on minor differences of the materials of the bimetals and on the mounting space of the bimetals.

Further, in order to accomplish fast contact of the bimetal, the spacing between the bimetal and the ground should be maintained within a very narrow range (about 0.1-0.3 mm). However, in this case, the risk of fire is increased because heat of about 600° C. to 700° C. is produced by the continuous discharge for about 5 seconds until operating time, and the insulation properties are reduced by dust and moisture due to the narrow spacing.

Also, when constant spacings must be maintained, the mass production of products having constant operating properties is very difficult to achieve. In particular, the spacing of the bimetal is easily changed by contact with other articles during the production process.

Further, the rate of corrosion is high because the bimetal has an iron component (Fe), and the resistance of contact on the bimetal also becomes high and the accuracy of the operation according to the standard specification can not be expected when the flow of current is great.

Korean Utility Model Reg. No. 11754 (Inventors: KI HO CHUNG et al, "Safety Connector for Communication: filed Nov. 29, 1973 under Korean UM Application No. 6577/1973) discloses a "Safety Connector for Communication" in which the current leading portion of contacts is lowered because heat of the heat coil is produced and low melting temperature lead (Pb) fixing "Notice" indicating lamp is melted, and at same time, "Notice" indicating rod is shown by raisingly projecting. The safety connector is thus intended not to be again used when the unit comprising the heat coil and "notice" indicating lamp are once operated, and a new safety connector must be substituted. Furthermore, structure of this safety device is very complex and uneconomical, and, in addition, the communication equipment can not be operated until the substitute safety connector is installed.

Also in the prior art, the heat coil is wound on a bimetal connected to the outer line and the fixed contact is placed on the corresponding part with a moving contact on the bimetal. If overcurrent is produced, heating of the heat coil results and the bimetal is bent (or curved) and the moving contact of the bimetal makes contact with the fixed contact of ground terminal side and the overcurrent is grounded.

In the above-described prior art structures, if the overcurrent is led it is grounded, and if the factor producing the overcurrent is obviated, leading of current on the communication equipment side is automatically accomplished. Thus, the above-described problems are solved, but current intermittence on the communication equipment side cannot be operated speedily and precisely because the bimetal must be bent by heating of the heat coil such that the moving contact makes contact with the fixed contact of the ground terminal side when the overcurrent is led.

Further, as described on the specification of U.S. Pat. No. 4,692,833 (Inventor: KI HO CHUNG, issued Sept. 8, 1987), a safety device for communication is provided which includes a triode. The triode has a difference in operating time of expansion and contact of the bimetal by the material of the bimetal and the gap between the electrodes, and when the gap between both electrodes and the bimetal adhered to the ground electrode is maintained within the range of from about 0.1 mm to 0.3 mm in order to achieve relatively rapid contact operation, an operating time of 5 seconds is still necessary. Accordingly, in this case, high heat of about 600° C.–700° C. is produced by the continuous discharge and there is danger of fire.

SUMMARY OF THE INVENTION

It is the purpose of the present invention to provide a safety device for communication equipment which overcomes the deficiencies of the above-described prior art wherein a communication circuit is promptly and precisely grounded when overvoltage is applied to the circuit or overcurrent is led to it, wherein the production of excessive heat, and of damage to the communication equipment is prevented, and wherein simple manufacturing processes are provided.

The present invention comprises a safety device for communication equipment which includes an overvoltage protective circuit which comprises a ceramic discharge tube having a ground electrode on the middle part of the discharge tube, and end electrodes on opposite sides of the discharge tube; a shorting member positioned between the ground electrode and the end electrodes; and insulating means for preventing the shorting member from electrically coupling the ground electrode and the end electrodes, the insulating means including a low melting temperature material which is melted upon the release of heat by the ceramic discharge tube at a desired temperature as a result of an overvoltage for causing the shorting member to electrically couple and provide a short circuit between the ground electrode and the end electrodes.

Other features and advantages of the present invention will become apparent from the following detailed description, taken in conjunction with the accompanying drawings.

DETAILED DESCRIPTION OF THE PREFERRED EMBODIMENTS

Figure 1:
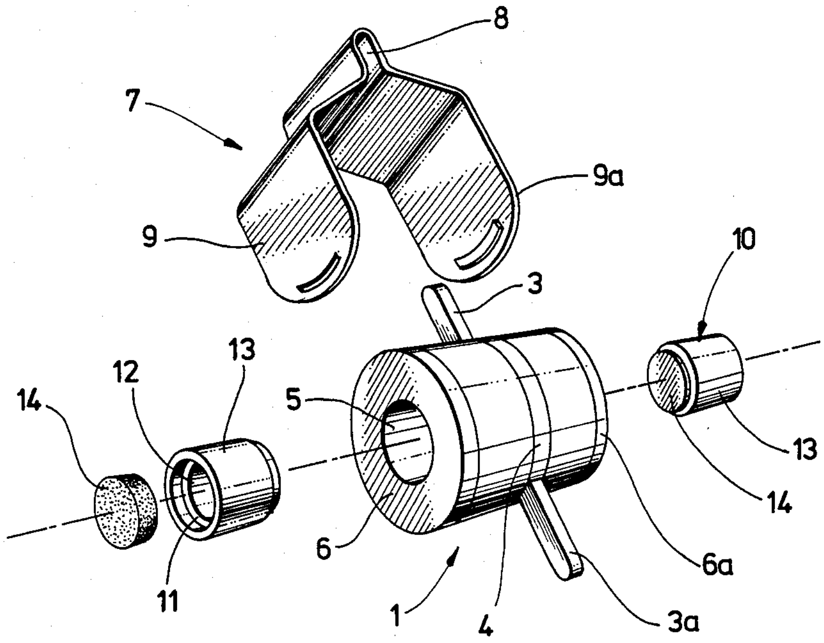
FIG. 1 is an exploded perspective view illustrating one embodiment of a ceramic discharge tube according to the present invention.
Figure 2A:
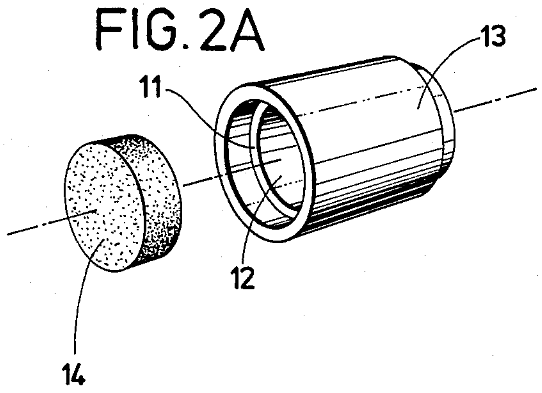
FIG. 2(A) is an exploded perspective view of an insulating body of the discharge tube of FIG. 1.
Figure 2B:
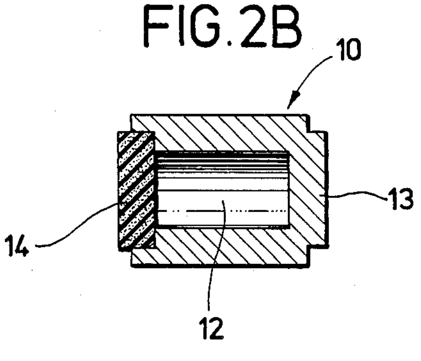
FIG. 2(B) is an assembled sectional view of the insulating body.

Referring to FIGS. 1 to 3, reference numeral 1 is a discharge tube body having a ground electrode 4 formed with upper and lower ground rods 3 and **3*a* on the central part thereof, and end electrodes 6 and 6*a* having central recesses 5 on both end surfaces thereof. Tube body 1** is a structure substantially identical with that of a triode.

Reference numeral 7 is an inverted and modified U-shaped metal elastic body which is provided with conductivity and elasticity. On the middle part of the metal elastic body 7, an inserting groove 8 is provided to receive the ground rod 3, and on both sides of body 7, elastic plate portions 9 and 9*a* are formed.

Reference numeral 10 is an insulating body which is fittingly inserted into the central recesses 5 on both end electrodes 6 and 6*a*. Body 10 comprises a low melting temperature material 13 (for example, Pb having a melting temperature of about 200°–250° C.) of cylindrical form having a stepped chin 11 formed on the outer end thereof, and a hollow portion 12 formed on the middle part thereof. An insulating material 14 of circular form is inserted into the stepped chin 11 of the low melting temperature material 13 as shown.

Reference numerals 15 and 15*a* identify overvoltage protective elements. P is a leading line and T is a charge line.

Referring now to FIGS. 4 to 7, reference numeral 16 is a shorting piece (or metal plate) which is inserted on upper ground rod 3, and is composed of a conductive material having a little elasticity. The ends of piece 16 are positioned adjacent the end electrodes 6 and 6*a*.

Reference numeral 17 is a low melting temperature material on which the plate 16 is supported. Material 17 does not touch the end electrodes 6 and 6*a* and is composed of a substance such as Pb (Melting Temp: 200°–250° C.), plastic resins or paraffins.

Figure 7A:
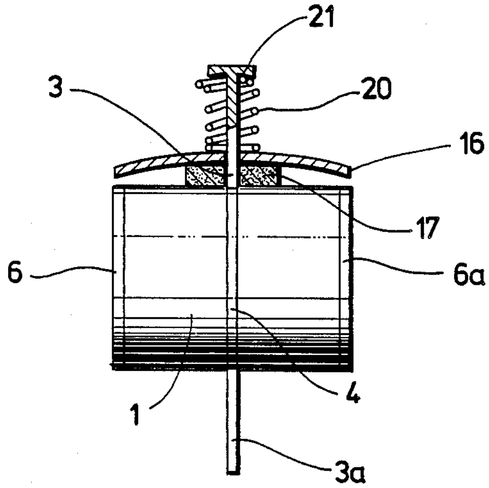
FIGS. 7(A) and 7(B) illustrate modifications of the device of FIG. 4.
Figure 7B:
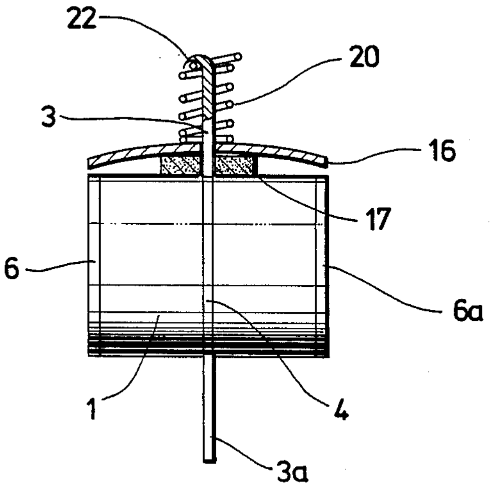

Reference numeral 18 is a locking pin which is inserted into a pin hole 19 on the upper end of ground rod 3, and reference numeral 20 is a spring which is elastically supported between the locking 18 and the metal plate 16 (or shorting piece). In FIG. 7(A), instead of fixing spring 20 by inserting the locking pin 18 into the pinhole 19 at the upper end of the ground rod 3, a T-shaped locking piece 21 is formed on the upper end of the ground rod 3 to prevent the removal of spring 20. In FIG. 7(B), a hook-shaped locking piece is formed on the upper end of the ground rod 3.

Referring now to FIGS. 8 to 13, insulating body 10 is inserted into the recesses 5 which are formed in the central portion of the end electrodes 6 and 6*a* of the discharge tube body 1. Shorting pieces (or elastic rods) 24 are inserted between the insulating material 14 of the insulating bodies 10 and a conductive plate 23 of the housing which is also connected to a ground rod 3 and/or 3*a*.

Figure 9:
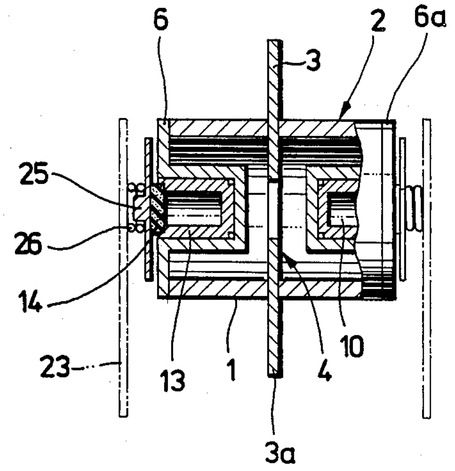

In the embodiment of FIG. 9, a pressing plate 25 is elastically supported by a spring between the conductive plate 23 and the insulating material 14 of the body 10 instead of the shorting pieces.

Figure 10:
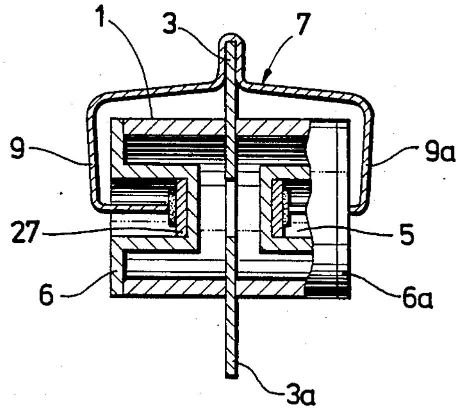

In the embodiment of FIG. 10 the elastic plates 9 and 9*a* of both sides of metal elastic body (or shorting piece) 7 as shown in FIGS. 1 to 3 are inwardly curved into the recesses 5, and the low melting temperature material and insulating material 27 is elastically supported within the recesses 5.

Figure 8:
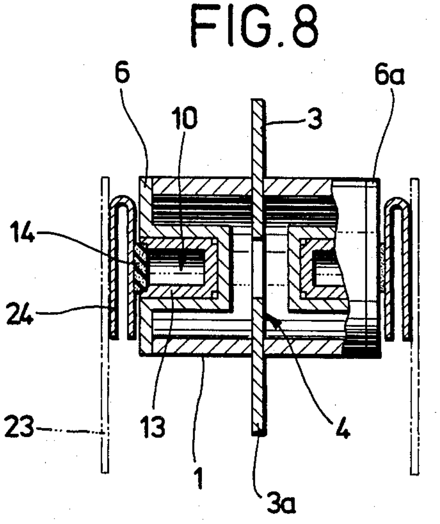
FIGS. 8 to 13 are partial sectional views illustrating further alternative embodiments of the present invention.
Figure 11:
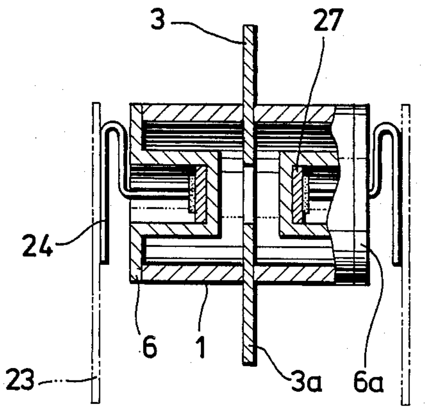

In the embodiment of FIG. 11, one end of the elastic rods (or shorting piece) 24 as shown in FIG. 8 is inwardly curved into the recesses 5 of the end electrodes 6 and 6*a*, and the low melting temperature and insulating material 27 is elastically supported within said recesses 5.

Figure 12:
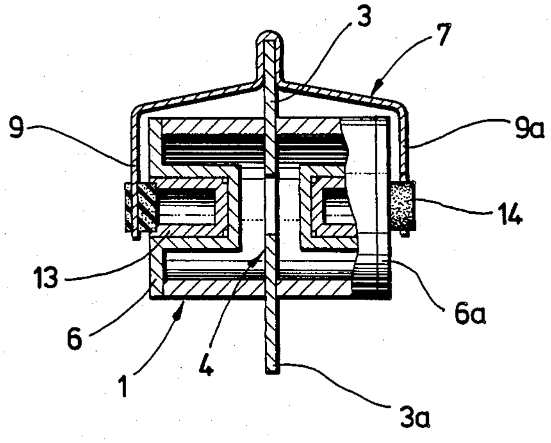
Figure 13:
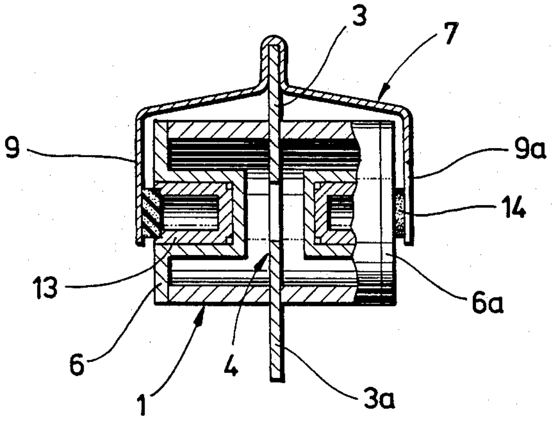
Figure 14:
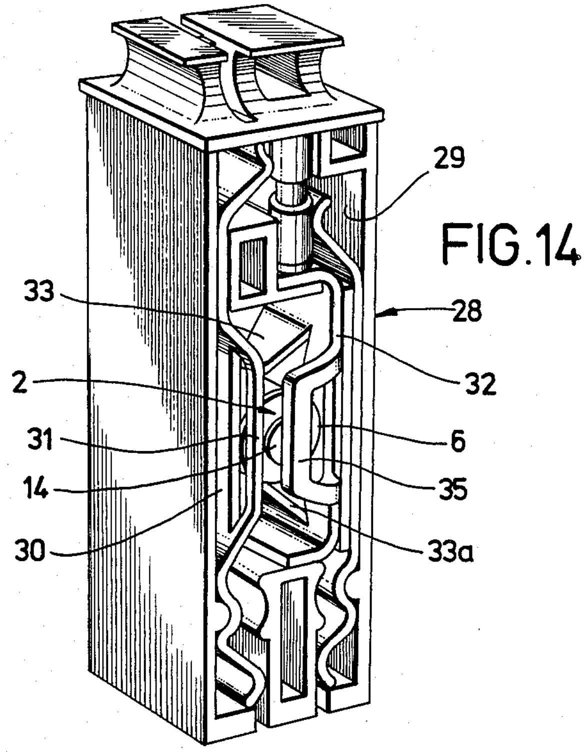
FIG. 14 is a perspective view illustrating a discharge tube and an overcurrent protective element within the housing of a plug for a safety device according to the present invention.

FIGS. 12 and 13 illustrate embodiments similar to that shown in FIGS. 1 to 3. The low melting temperature material 13 is inserted into the recesses 5 of the end electrodes 6 and 6*a*, and the insulating material 14 is inserted into the stepped chin 11 of the material 13. In FIG. 12, the insulating material 14 is fittingly inserted on the elastic plates 9 and 9*a* of the metal elastic body (or shorting piece) 7, and in FIG. 13 the insulating material 14 is fixedly adhered to the inner surfaces of the metal elastic plates 9 and 9*a*.

FIGS. 14 to 17 show a safety connector (or plug) in which a discharge tube 2 as shown in FIGS. 1 to 13 is inserted. Reference numeral 29 is a housing comprising a safety connector 28. In the housing 29, a plurality of recessed grooves are provided within which connecting terminal bars are insertedly disposed. Within the terminal bars, contacting portions 31 and 31*a* are pressingly disposed on terminal plates 30 and 30*a* which are connected to the end electrodes 6 and 6*a* of the ceramic discharge tube 2.

Reference numeral 32 is a ground terminal plate. On the ground terminal plate 32, connecting pieces 33 and 33*a* are disposed and ground rods 3 and 3*a*, which are connected to the ground electrode 4 of the discharge tube 1, are inserted in the slits 34 and 34*a* of the connecting pieces 33 and 33*a*. The insulating material 14 of the insulating body 10, which is inserted into the recesses 5 of the end electrodes 6 and 6*a*, is elastically supported by two elastic pieces 35 and 35*a* on both sides of the ground terminal plate 32.

Figure 15A:
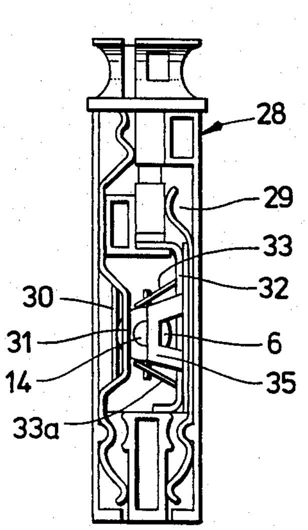
FIG. 15(A) is a front elevational view of the apparatus of FIG. 14.
Figure 15B:
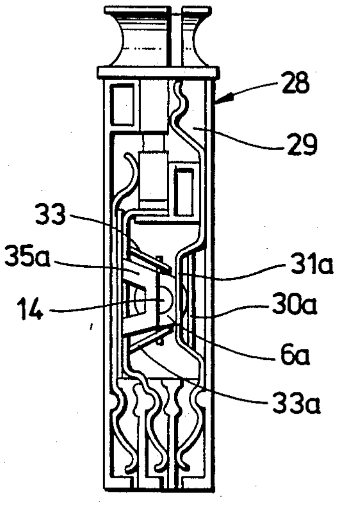
FIG. 15(B) is a rear elevational view of the apparatus of FIG. 14.
Figure 16:
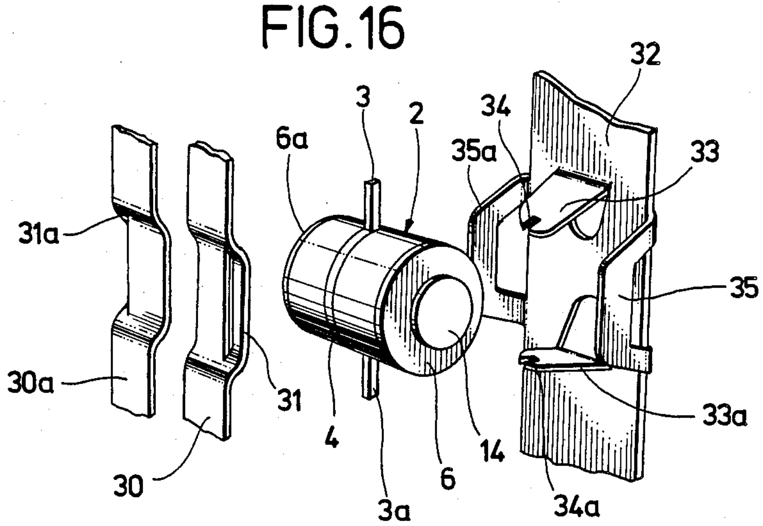
FIG. 16 is an exploded perspective view of a portion of the apparatus of FIG. 14.

FIGS. 15(A) and (B) show states in which the insulating material 14 of the discharge tube 1 is not elastically supported by the elastic pieces 35 and 35*a* mounted on both sides of the ground terminal plate 32, as shown in FIGS. 11 to 14, and in which the shorting piece (or metal elastic plate) 7 is elastically supported, as shown in FIGS. 1 to 3, and FIG. 10.

Figure 18:
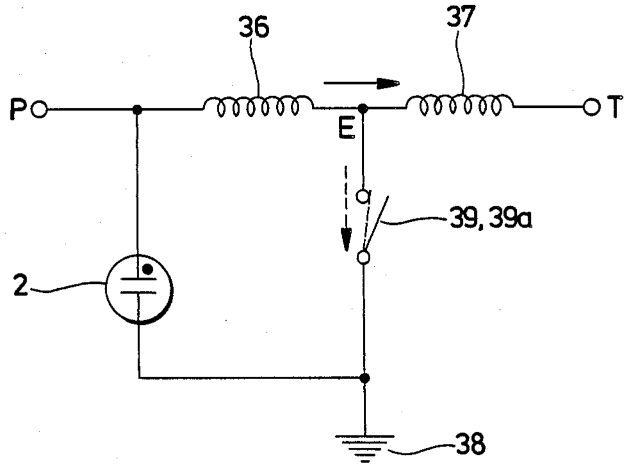
FIG. 18 is a circuit diagram illustrating one embodiment of the current interrupting device of the present invention.

FIGS. 18 to 22 relate to a protective device by which overcurrent is interrupted by leading overcurrent. As shown in FIGS. 18 to 19, an auxiliary heat coil 36 and a main heat coil 37 are disposed between a leading line P and a charge line T, and a contact E is placed between the auxiliary heat coil 36 and the main heat coil 37. Further, bimetals 39 and 39*a* are mounted between contact E and the ground 38, and the ceramic discharge tube 2 is discharged between the leading line P and the ground 38.

Figure 20:
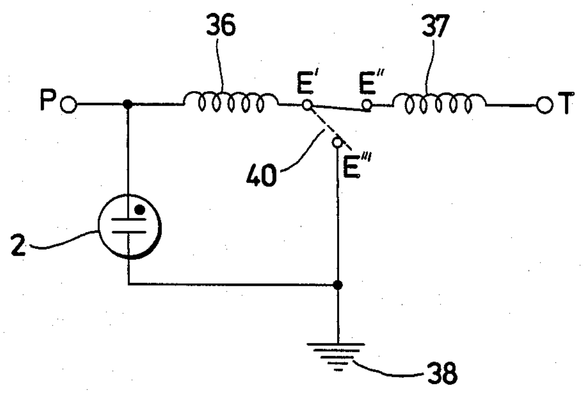
FIGS. 20 and 21 are a circuit diagram and a partial perspective view, respectively illustrating another embodiment of the current interrupting device of the invention.
Figure 21:
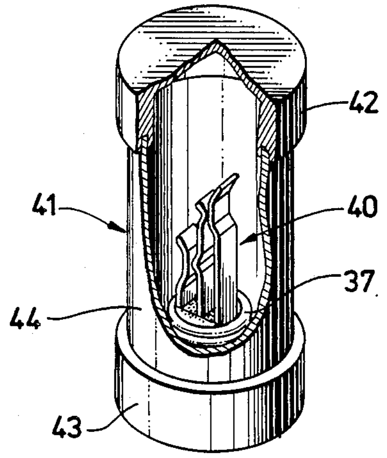

FIG. 20, illustrates another embodiment of the present invention, and utilizes the same reference numbers as in FIG. 18, for the same structures. In the FIG. 20 embodiment, the auxiliary heat coil 36 and main heat coil 37 are placed between the leading line P and the charge line T, and the bimetal 40 having contacts E, E″ and E‴ is mounted as shown in FIG. 20.

Figure 22A:
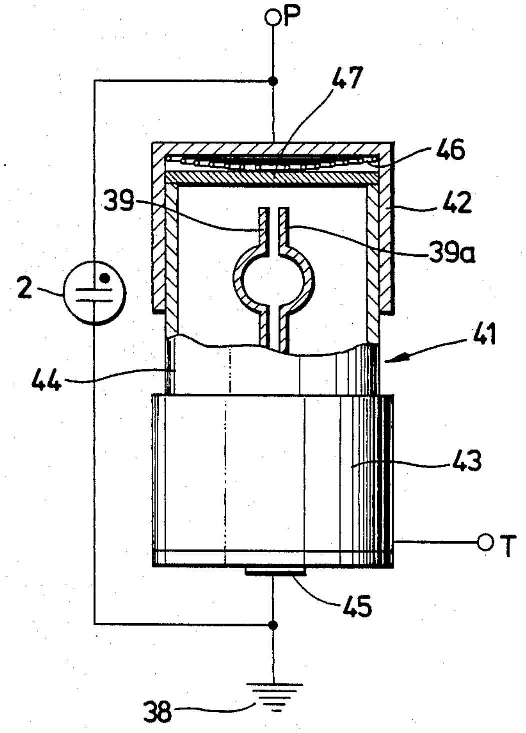
FIGS. 22(A) and 22(B) illustrate yet a further embodiment of the current interrupting device of the present invention before and after operation, respectively.
Figure 22B:
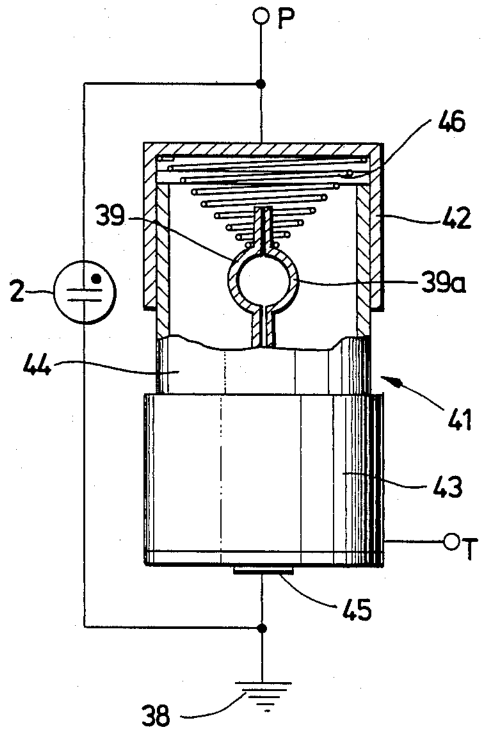

In FIGS. 22(A) and 22(B), reference numeral 41 is a housing comprising an overcurrent protective element according to the present invention. The housing 41 comprises a upper terminal cap 42, a bottom terminal cap 43 and a cylindrical enclosure 44 (as a nonconductor). A bottom terminal 45 of a bimetal 39*a* which is connected to the ground 38 is disposed on the bottom of the bottom terminal cap 43. Reference numeral 46 is an inverse cone-shaped spring which is disposed in the upper side of the interior of the upper terminal cap 43, and is pressingly fixed by low melting material 47.

The proposed safety devices of the present invention according to FIGS. 1 to 22, operate in the following manner. The safety device shown in FIGS. 1 to 3 is assembled by inserting the insulating bodies 10 in the recesses 5 formed in the central parts of the end electrodes 6 and 6*a* of the tube body 1. The ground rod 3 is forcibly inserted into the groove 8 of the metal elastic plate (or shorting piece) 7, and the elastic plate portions 9 and 9*a* of the metal elastic plate 7 are placed against the insulating material 14 of the insulating bodies. A reinforced groove is provided on the tube body to press outwardly on the middle part of the metal elastic plate 7 or a proper number of inward projections are provided on the elastic plates 9 and 9*a* to press against the tube body to provide sufficient elasticity to ensure proper operation of the elastic plates.

Figure 3A:
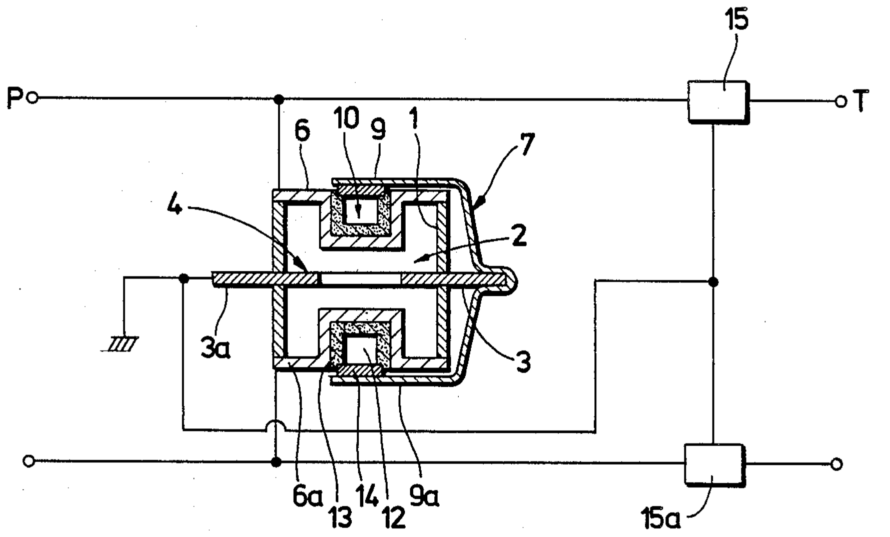
FIG. 3(A) is a view showing the discharge tube of FIG. 1 before operation.
Figure 3B:
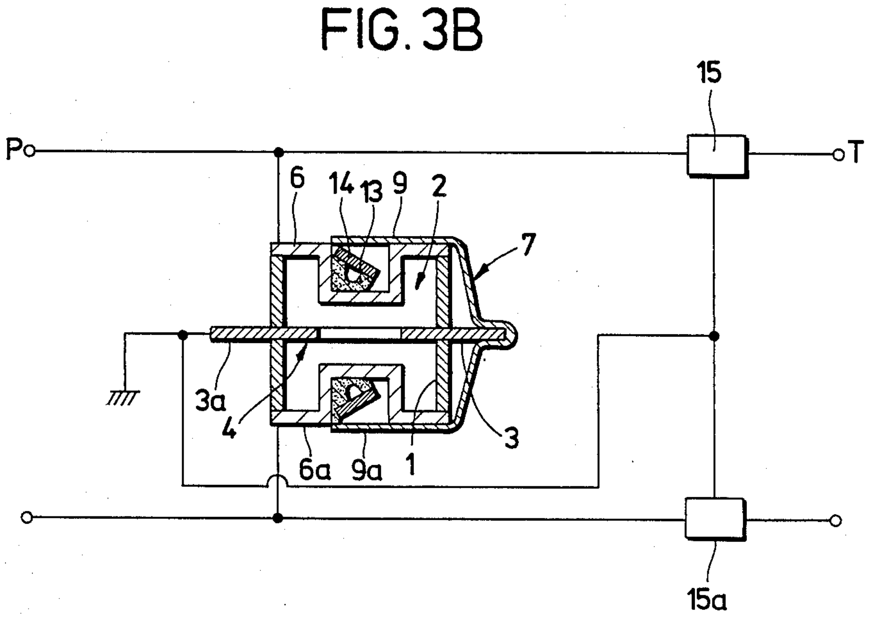
FIG. 3(B) is a view illustrating the discharge tube of FIG. 1 after operation.
Figure 4:
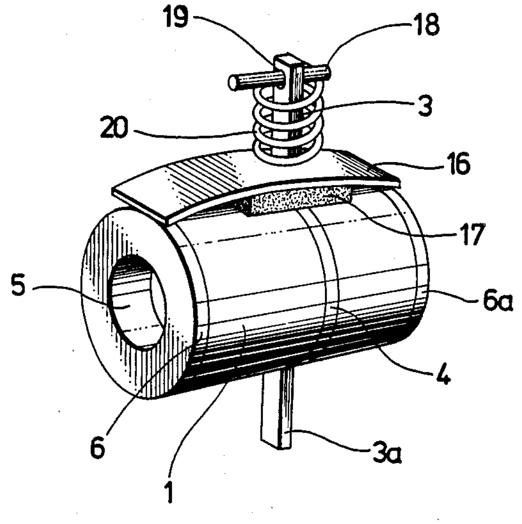
FIG. 4 is a perspective view illustrating a second embodiment of the present invention.

As shown in FIG. 3(A), the end electrodes 6 and 6*a* and the metal elastic plate (or shorting piece) 7 are held apart by the insulating bodies in the normal state. When, however, the discharge tube body 1 is heated to within the range of from about 250° C. to 300° C. by leading overvoltage to one end electrode of the end electrodes 6 and 6*a*, and is held there at for a sufficient time, the low melting temperature material 13, which is inserted in the recesses 5 of the end electrodes 6 and 6*a*, starts to melt and flows into the hollow portions 14. At the same time, the elastic plate portions 9 and 9*a* of the metallic elastic plate 7 are able to push the insulating material 14 inwardly as shown in FIG. 3(B). Accordingly, the elastic plate portions 9 and 9*a* of the metal elastic plate 7 (or shorting piece) touch the end electrodes 6 and 6*a* and the voltage, which is led on the line, is grounded with the ground electrode 4 and the potential difference between the electrodes is at a nearly zero state.

Figure 5A:
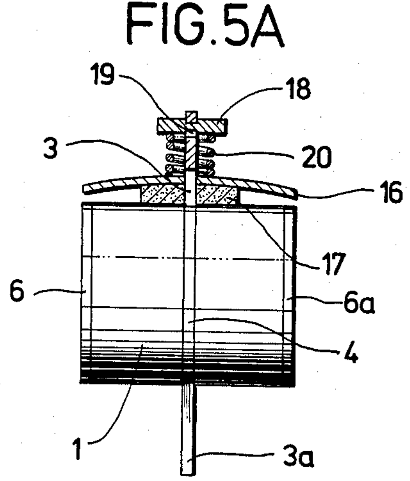
FIG. 5(A) is a view showing the device of FIG. 4 before operation.
Figure 5B:
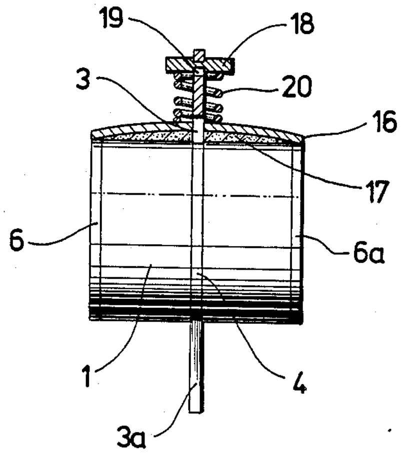
FIG. 5(B) is a view showing the device of FIG. 4 after operation.
Figure 6:
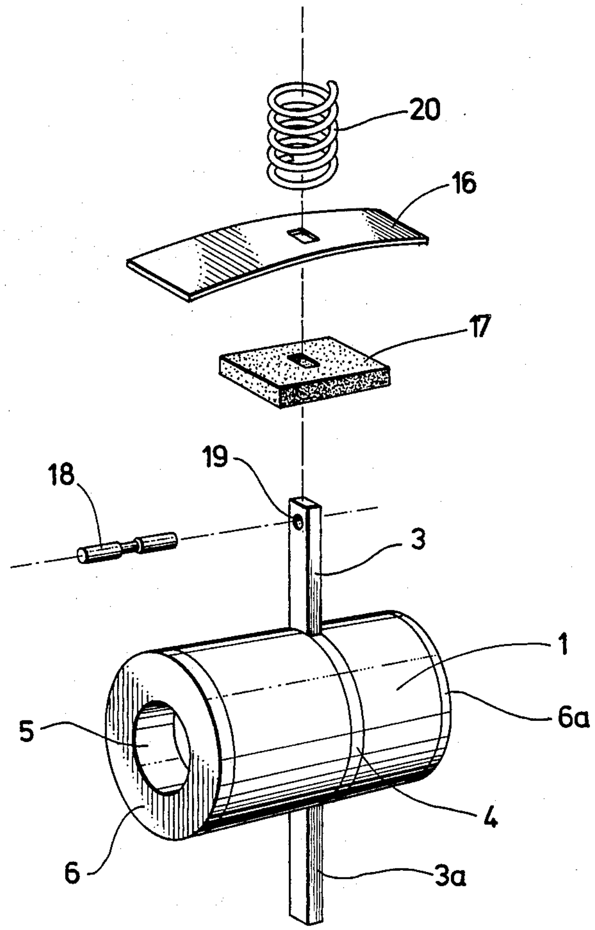
FIG. 6 is an enlarged and exploded perspective view of the device of FIG. 4.

The operation of the embodiments of FIGS. 4 to 7 will now be described. When the voltage is in the normal state or when a comparatively low overvoltage is led on the end electrodes, the discharge tube body 1 is in the normal state (FIG. 5(A)). When very high voltage is led on the end electrodes 6 and 6*a*, however, the tube body 1 starts to discharge and the temperature of the tube body 1 is raised to 250° C.-300° C. The low melting temperature material 17 is then melted and the metal elastic plate (or shorting piece) 16 is allowed to touch the end electrodes 6 and 6*a* of the tube body 1 as shown in FIG. 5(B), due to the elasticity of the spring 20 and the weight of the plate 16; and the high voltage is grounded. Accordingly, the potential difference between the end electrodes and the ground electrodes is at a nearly zero state.

The fixing and supporting structure by which the metal elastic plate 16 is supported by the spring 20 may take many forms as exemplified by FIGS. 4–7. In the FIGS. 4 to 6, embodiment, after positioning the low temperature melting material 17 on body 2, the metal elastic plate 16 and the spring 20 are, in sequence, inserted on the upper ground rod 3 and then locking pin 18 is fixedly inserted into the pin hole 19 of the ground rod 3 of the ground electrode 4. In FIG. 7(A), the top end of the upper ground rod 3 is formed with T-shaped locking piece 21 and one end of the spring 20 is allowed to be supported and locked in the recess of the locking piece 21. In FIG. 7(B), the top of the upper ground rod 3 is bent and formed with a hook-shaped locking piece 22, and spring 20 is inserted in the locking piece 22. The assembly of the FIG. 7(B) embodiment is particularly easy to accomplish.

In the embodiments of FIGS. 8 and 9, the insulating body 10 is inserted in the recesses 5 of the end electrodes 6 and 6*a*, and the pressing plate 25 which is elastically supported by the spring 26 (FIG. 9) or the elastic rod 24 (FIG. 8) is positioned between the insulating material 14 of the body 10 and the conductive plate 23. Overvoltage is led on one end electrode or both end electrodes 6 and 6*a*, and when the ceramic discharge tube 2 is heated to more than a desired temperature, the low melting temperature material 13 of the insulating body 10, as shown in FIGS. 1 to 3, is melted within the hollow portion 12 and the elastic rod 24 or the pressing plate 25 touches the end electrodes 6 and 6*a* to ground the end electrodes.

In the embodiment of FIG. 10, the low melting temperature and insulating material 27 is inserted in the recesses 5 in the end electrodes 6 and 6*a*. The upper ground rod 3 is inserted in the groove 8 of the metal elastic plate 7 and then the ends of the curved portion on the elastic plate portions 9 and 9*a* of the shorting piece (or metal elastic plate) 7 is fixedly supported on the surface of the low temperature melting and insulating material 27. In such state, the overvoltage is led on one end electrode of the end electrodes 6 and 6*a*, and when the temperature of the ceramic discharge tube 2 is raised to more than a desired temperature the material 27 melts and flows downwardly in the Fig. The support for the ends of the curved portions of the shorting piece 7, is lost and the elastic plate portions 9 and 9*a* of the shorting piece 7 touch the end electrodes 6 and 6*a*, and grounds the electrodes.

In the FIG. 11 embodiment, the low melting temperature and insulating material 27 is inserted in the recesses 5 of the end electrodes 6 and 6*a* and the elastic rods 24 are inserted between the material 27 and the conductive plate 24 and the inwardly bent curved portions of the elastic rods 24 are fixedly supported on the surfaces of the material 27. When overvoltage is led and the discharge tube 2 is heated to more than a desired temperature, the material 27 melts and the support or the curved portions of the elastic rods 24 is lost. Accordingly, the elastic rods 24 touch the end electrodes 6 and 6*a*, and overvoltage is speedily grounded through the ground electrode 4.

The operation of the embodiments of FIGS. 12 and 13 are identical with those of the embodiment of FIGS. 1 to 3.

FIGS. 14 to 17 disclose a ceramic discharge tube 2 fixed within a housing 29 of a safety connector. Contacting portions 31 and 31*a* are pressingly disposed, respectively, on a terminal plate 30 which is connected to a leading line P and on a terminal plate 30*a* which is connected to the charge line T. The respective terminal plates are inserted into a plurality of grooves of the housing. The contacting portions 31 and 31*a* are connected to the end electrodes 6 and 6*a* of the discharge tube 2, and at the same time, the ground rods 3 and 3*a* are fittingly inserted into the slits 34 and 34*a* of the connecting pieces 33 and 33*a* on the ground terminal 32. The insulating material 14 of the insulating body 10 protruding from both sides of the discharge tube 2 is elastically supported on the elastic pieces 35 and 35*a* on both sides of the ground terminal plate 32.

When the discharge tube body 1 starts to discharge by leading overvoltage and is heated to more than a desired temperature, the material 13 which is inserted in the recesses 5 of the end electrodes 6 and 6*a* start to melt and flow downwardly within the hollow portions 12, and, at the same time, the elastic plates 35 and 35*a* of said ground terminal plate 32 touch the end electrodes 6 and 6*a*. Thus, the terminal plate 30 on the leading line P and the ground terminal plate 32 are directly connected and the overvoltage is grounded. Accordingly, the potential difference between the end and ground electrodes is at a nearly zero state and overvoltage does not run to the communication equipment side.

Figure 17:
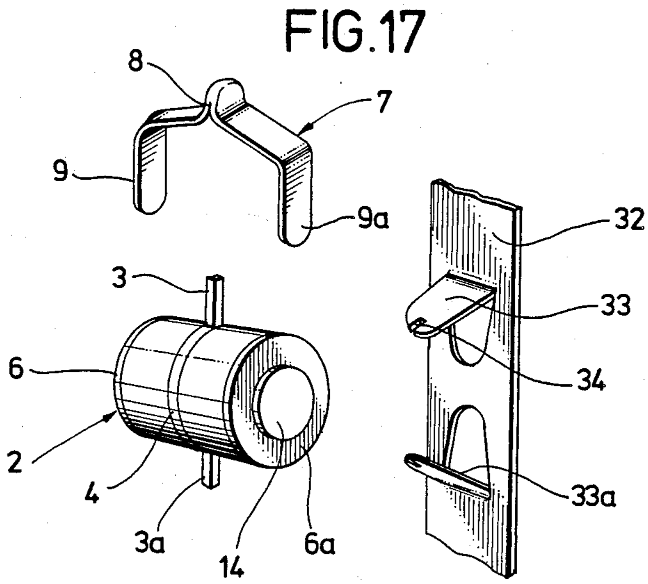
FIG. 17 is an exploded perspective view illustrating an alternative embodiment of the apparatus of FIG. 14.

Also, as shown in FIG. 17, a shorting piece (or metal elastic plate) 7 is positioned adjacent the end electrodes 6 and 6*a* as in the FIGS. 1 to 3 embodiment, instead of elastic pieces 35 and 35*a* on the ground terminal plate 32. In this embodiment overvoltage is grounded through the upper and lower ground rods 3 and 3*a*, the contacting pieces 33 and 33*a* and the ground terminal plate 32. Accordingly, the embodiment of FIG. 17 function in substantially the same manner as in that of the embodiments of FIGS. 14–16.

Figure 19A:
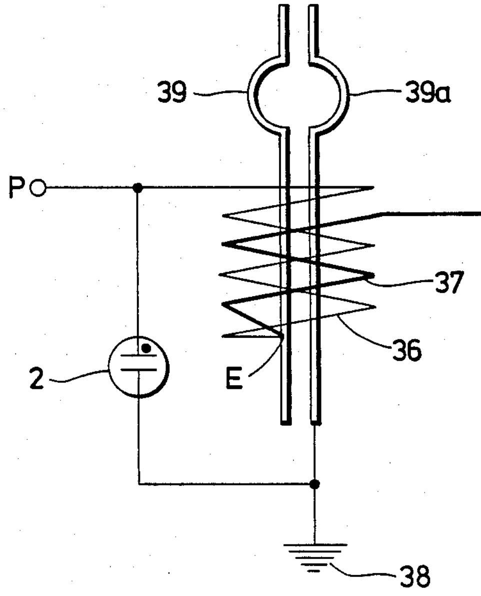
FIG. 19(A) is a circuit diagram illustrating a portion of the current interrupting device of FIG. 18 before operation.
Figure 19B:
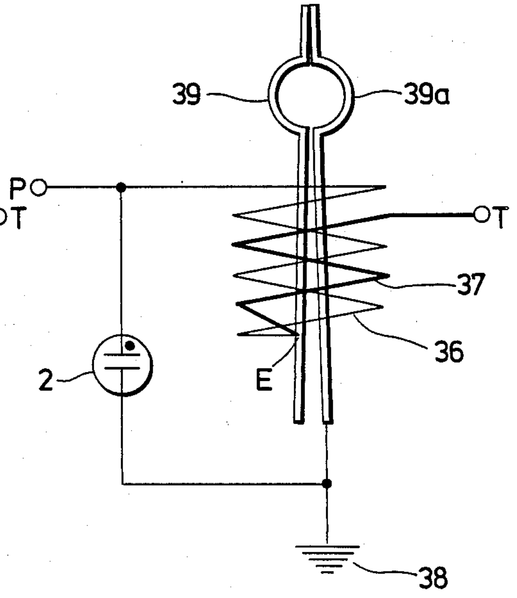
FIG. 19(B) is a circuit diagram illustrating the portion of the current interrupting device of FIG. 18 after operation.

The operation and effect of the overcurrent protective element, as shown in FIGS. 18 to 22, will now be described in greater detail. In FIGS. 18 and 19, when overvoltage and overcurrent are led by contact with lightning or a high voltage cable on the leading line P, the over voltage is grounded to the ground 38 through the discharge tube 2, and the auxiliary and main heat coil 36 and 37 are heated by the overcurrent at the moment of its passing through said heat-coils 36 and 37. The bimetals 39 and 39*a* are operated and contact one another, as shown in broken lines in FIG. 18 and FIG. 19(B), and the leading overcurrent on the leading line P is grounded through the auxiliary heat coil 36, contact E, bimetal 39 and bimetal 39*a*, and the overcurrent is completely interrupted on the main heat coil 37 and the charge line T. If the leading overcurrent does not promptly return to the normal state, the bimetals 39 and 39*a* are held in contact and ground the leading overcurrent through the ground 38. FIG. 19(A) shows the system before operation, and FIG. 19(B) shows the system after operation.

As shown in FIG. 20, contacts E′ and E″ in the contacts E′, E″ and E‴ of the bimetal 40 are normally in contact and when overcurrent is led, the heat coils 36 and 37 are simultaneously heated and contacts E′ and E″ are changed by operation of the bimetal 40. Accordingly, the main heat coil 37 and the charge line T are completely interrupted and the communication equipment side is protected. The contacts E′ and E‴ of the bimetal 40 are held in the heating state by heating of the auxiliary heat coil 36, the charge line T is completely interrupted and the communication equipment is protected.

The effect of FIG. 20 is superior to that of FIGS. 18 and 19, but is more complicated to manufacture. As described above, the overcurrent which is led on the leading line P is not run on the charge line T, but in case of continuation of the overcurrent, the closed contacts E′ and E″ of the bimetal 39, 39*a* and 40 are caused to remain in the closed state by the auxiliary heat coil 36.

The auxiliary heat coil 36 has a danger of overheating by the closing of the contacts E′ and E″ of the bimetals 39, 39*a* and 40 for a long period of time and by overheating, the housing 41 has the possibility of catching fire. Accordingly, as shown in FIGS. 22(A) and 22(B), an inversed cone-shaped spring 46, is fixedly supported by the low temperature melting material 47 within the upper terminal cap 42, and when the temperature of the auxiliary heat coil 36 is raised to within the range of from 100° C. to 120° C., the material 47 melts downwardly, and at same time, the spring 46 is elastically moved, and directly touches the bimetals 39, 39*a* and 40 forming an electrical circuit. At this time, the upper ends of the bimetals 39, 39*a* and 40 which the contacts E′ and E″ are closed contacts the lower end of the spring, and the leading overcurrent is grounded on the ground 38 through the upper terminal cap 42, the spring 46, bimetals 39, 39*a* and 40 and a bottom terminal cap 43. That is, the leading overcurrent is directly connected to the ground 38 without passing through the auxiliary heat coil 36, and overheating of the heat coil 36 is prevented and the danger of fire for the housing 41 of the overcurrent protective element is prevented. However, in this case, the overcurrent protective element, once operated, should be substituted with another overcurrent protective element.

While the present invention has been described with reference to specific embodiments thereof, it will be understood that numerous modifications may be made by those skilled in the art without actually departing from the scope of the claimed invention. Accordingly, all modifications and equivalents may be resorted to which fall within the scope of the invention as claimed.

I claim:

1. A safety device for communication equipment comprising:

a connector including a ceramic discharge tube having a ground electrode connected in series with upper and lower ground rods on the middle part of a discharge tube body and end electrodes on opposite sides of the discharge tube body, said end electrodes each having a central recess therein;

an insulating body positioned in the central recess of each end electrode, each insulating body including a low melting temperature material which is melted upon the release of heat by said ceramic discharge tube at a desired temperature as a result of an overvoltage;

a ground terminal plate having a pair of connecting pieces protruding from said ground terminal plate, said connecting pieces having slits thereon for receiving said ground rods;

a pair of end terminal plates connected to said end electrodes; and a pair of elastic plates which are disposed on both sides of the ground terminal plate to be pressed against said insulating bodies and prevented from contacting said end electrodes by said insulating bodies, whereby upon melting of said low melting temperature material, said elastic plates contact said end electrodes for coupling said end terminal plates to said ground plate to provide a short circuit between said ground electrode and said end electrodes.

2. A safety device for communicating equipment, said safety device including an overvoltage protective circuit comprising:

a ceramic discharge tube having a ground electrode on the middle part of the discharge tube, and end electrodes on opposite sides of the discharge tube;

a shorting member positioned between said ground electrode and said end electrodes; and insulating means for preventing said shorting member from electrically coupling said ground electrode and said end electrodes, said insulating means including a low melting temperature material which is melted upon the release of heat by said ceramic discharge tube at a desired temperature as a result of an overvoltage for causing said shorting member to electrically couple and provide a short circuit between said ground electrode and said end electrodes, said device further including upper and lower ground rods extending outwardly from said ground electrode, said shorting member being electrically coupled to said ground electrode through one or both of said ground rods.

3. The safety device of claim 2 wherein said shorting member comprises a U-shaped elastic metal body having an inserting groove for receiving said upper ground rod and an end portion positioned adjacent each end electrode, and wherein said insulating means comprises a pair of insulating bodies for normally separating each end portion from its adjacent end electrode.

4. The safety device of claim 3 wherein each end electrode includes a central recess, and wherein an insulating body is positioned in the central recess of each end electrode.

5. The safety device of claim 4 wherein said insulating body further includes an insulating material for insulating the end portions of said metal body from said low melting temperature material.

6. The safety device of claim 5 wherein said insulating material of said insulating bodies are adhered to said end portions of said metal body.

7. The safety device of claim 2 wherein said shorting member comprises a round metal plate through which said upper ground rod extends and said insulating means is positioned between said metal plate and the discharge tube; and wherein said device further includes a spring surrounding said upper ground rod for pressing said round metal plate against said insulating means whereby upon melting of said low melting temperature material, said spring presses said plate against said discharge tube to electrically couple and provide a short circuit between said ground electrode and said end electrodes.

8. The safety device of claim 7 wherein said spring is locked to said upper ground rod by a fixing pin extending through a pin hole in the upper end of the upper ground rod.

9. The safety device of claim 7 wherein said spring is locked to said upper ground rod by a T-shaped locking member which is integral with the upper end of the upper ground rod.

10. The safety device of claim 7 wherein said spring is locked to said upper ground rod by a hook-shaped locking member which is integral with the upper end of the upper ground rod.

11. The safety device of claim 2 wherein each end electrode includes a central recess and said insulating means comprises an insulating body positioned in the central recess of each end electrode, and wherein said shorting member comprises conductive plate means coupled to the upper and/or lower ground rods, and U-shaped elastic metal bodies positioned between the conductive plate means and each insulating body.

12. The safety device of claim 2 wherein each end electrode includes a central recess and said insulating means comprises an insulating body positioned in the central recess of each end electrode, and wherein said shorting member comprises conductive plate means coupled to the upper and/or lower ground rods, T-shaped metal bodies in contact with each insulating body and spring members fixedly positioned between each T-shaped metal body and the conductive plate means.

13. A safety device for communication equipment including an auxiliary heat coil and a main heat coil placed between a leading line and a charge line, and bimetal switch means positioned between contacts of each of said heat coils and a ground line, said bimetal switch means including contacts normally adapted to connect the contacts of said heat coils and being responsive to an overcurrent passing through said heat coils for connecting said auxiliary heat coil to ground and for interrupting said overcurrent to said main coil.

14. The safety device of claim 13 wherein said bimetal switch means has three contacts, two contacts thereof being connected, respectively, to one end of each of the auxiliary heat coil and the main heat coil and the third contact being connected to the ground line.

15. The safety device of claim 14 wherein said bimetal switch means is disposed in an enclosure and wherein an inverted cone-shaped spring is positioned in said enclosure between an upper end portion of said enclosure and a low melting temperature material within the cylindrical enclosure, whereby upon overheating within said enclosure due to overcurrent, said low melting temperature material melts to release said spring to close said bimetal switch means to ground said overcurrent.

16. A safety device for communication equipment comprising:

- a ceramic discharge body;
- a ground electrode having one or more outwardly projecting ground rods mounted at a central region of said ceramic discharge body;
- further electrodes at opposite ends of said ceramic discharge body;
- at least one body composed of a low melting temperature material; and
- at least one electrically conductive shorting piece resiliently engaging between said ground electrode and said at least one body of low melting temperature material and insulated from said further electrode whereby heat generated by said ceramic discharge body when excess voltage is applied between said further electrodes causes a melting of said at least one body of low melting temperature material and allows said at least one shorting piece to contact said further electrodes directly to said ground electrode.

17. The safety device of claim 16 wherein said at least one shorting piece is electrically coupled to said ground electrode through at least one of said one or more ground rods.

18. The safety device of claim 16 and further including at least one body of insulating material between said at least one shorting piece and said further electrodes for normally separating said at least one shorting piece from said further electrodes.

19. The safety device of claim 18 wherein said at least one body of insulating material insulates said at least one shorting piece from said at least one body of low melting temperature material.

* * * * *

UNITED STATES PATENT AND TRADEMARK OFFICE

CERTIFICATE OF CORRECTION

PATENT NO. : 4,851,957

DATED : July 25, 1989

INVENTOR(S) : Ki Ho Chung

It is certified that error appears in the above-identified patent and that said Letters Patent is hereby corrected as shown below: On the title page:

In line 5 of the ABSTRACT, delete "head" and insert -- heat -- therefor.

In col. 2, line 1, delete "anxiety" and insert -- axiety -- therefor.

In col. 5, line 29, after "locking" insert -- pin --.

In col. 8, line 14, after "temperature" insert -- , -- (comma).

In col. 10, line 43 (Claim 2, line 1), delete "communicating" and insert -- communication -- therefor.

In col. 12, line 16 (Claim 15, line 3), delete "inverted" and insert -- inverse --.

In col. 12, lines 36-37 (Claim 16, lines 14-15), delete "electrode" and insert -- electrodes -- therefor.

In col. 12, line 39 (Claim 16, line 17), delete "a".

UNITED STATES PATENT AND TRADEMARK OFFICE

CERTIFICATE OF CORRECTION

PATENT NO. : 4,851,957

DATED : July 25, 1989

INVENTOR(S) : Ki Ho Chung

It is certified that error appears in the above-identified patent and that said Letters Patent is hereby corrected as shown below:

In col. 12, line 42 (Claim 16, line 20), delete "contact" and insert --connect--therefor.

Signed and Sealed this

Seventeenth Day of July, 1990

*Attest:*

HARRY F. MANBECK, JR.

*Attesting Officer* *Commissioner of Patents and Trademarks*